UNITED STATES PATENT OFFICE.

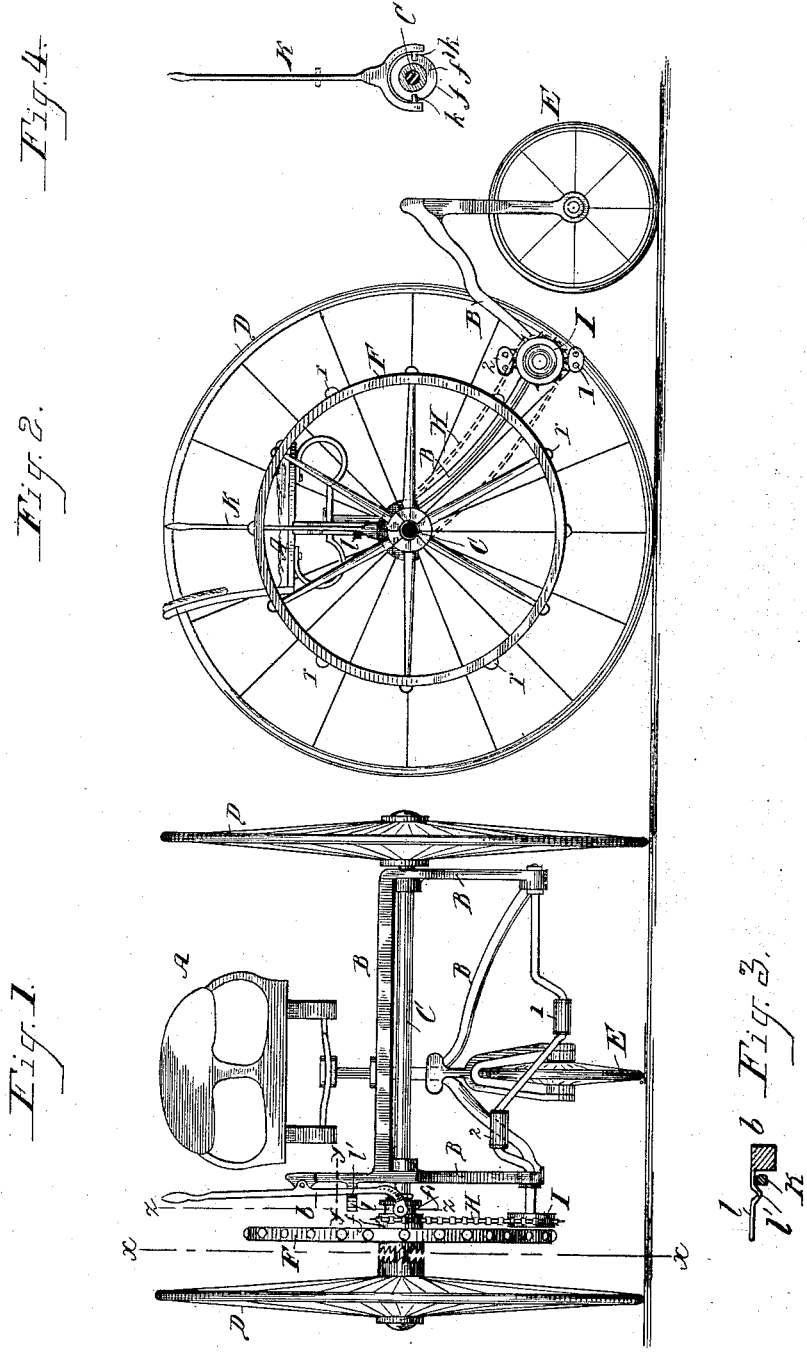

ARTHUR E. McENTEE, OF BROOKLYN, NEW YORK.

TRICYCLE.

SPECIFICATION forming part of Letters Patent No. 375,176, dated December 20, 1887.

Application filed July 2, 1887. Serial No. 243,223. (No model.)

*To all whom it may concern:*

Be it known that I, ARTHUR E. McENTEE, a citizen of the United States, residing in Brooklyn, in the county of Kings and State of New York, have invented certain new and useful Improvements in Tricycles, of which the following is such a full, clear, concise, and exact description as will enable others skilled in the art to which my invention appertains to make and use the same, reference being had to the accompanying drawings, which form a part of this specification.

The object of my invention is to construct a tricycle upon which the force for starting is gradually accumulated, and also an extra momentum given when running, whereby the machine is more readily set in motion and more easily propelled over uneven ground and up grades. To accomplish this object I mount upon the main axle of a tricycle a wheel of less diameter than the main supporting-wheels, and provided with gearing, whereby it may be revolved independently, and also, having shifting attachments and connections, whereby it may be made to engage and move with the main wheels when desired.

In the accompanying drawings, Figure 1 is a rear view of a tricycle fitted with my improvement. Fig. 2 is a side elevation taken through the line $x$ $x$ of Fig. 1. Fig. 3 is a horizontal section taken through the line $y$ $y$ of Fig. 1, showing cross-section of shifting-lever and upright, with plan view of spring-plate attached to upright and provided with a V-shaped projection for holding lever in position. Fig. 4 is a vertical cross-section of main axle and hub of the loose revolving wheel, taken through the line $z$ $z$ of Fig. 1, and shows a side elevation of bifurcated shifting-lever.

A represents the seat upon the body or frame B, which frame is of ordinary construction and provided with suitable bearings upon the axle C of the main wheels D and axle of small guiding-wheel E. Upon the main axle C, which is rigidly attached to the wheels D, is loosely mounted the wheel F, which is revolved thereon by the chain-bearing H, running over the hub $f$, provided with sprockets, and sprocket-wheel I, which is operated by the treadles 1 and 2 in the ordinary manner. In the inner side of the hub $f$ is an annular groove, $f'$, adapted to receive the pins or lugs $k$ $k$, secured to the lower ends of the bifurcated lever K, (best shown in Fig. 4,) which lever is pivoted upon the upright $b$ of the frame B, to which upright is also secured the spring-plate $l$, which bears against the lever K and is provided with a V-shaped projection, $l'$. The sides of the groove $f'$ afford suitable bearings for the pins or lugs $k$ $k$ of the lever K, whereby the wheel F, while rotating, may be shifted back and forth or held in or out of gear with supporting-wheel D. The projection $l'$ keeps the lever K in position when adjusted, the spring-plate $l$ being, however, sufficiently elastic to allow the lever to move back and forth when operated by the handle. The wheel F is preferably weighted, as by balls $r$ $r$, secured to its outer periphery, in order that it may revolve with greater force.

When it is desired to start the tricycle, the wheel F, being made to rotate by slight pressure upon the treadles, is shifted by the lever K and thrown in gear with the main wheel D, and the momentum which has been gradually given to the wheel F is thereby utilized in starting the machine.

When the tricycle is in motion, the wheel F, not touching the earth, is not impeded by inequalities of ground, and as it rotates in gear with the main wheels its force is imparted to the latter in driving the tricycle over obstructions and up grades; also, as the wheel F may be readily disconnected and allowed to revolve loosely upon the axle, it does not interfere with the quick stopping of the machine.

It is obvious that the details of the construction of the wheel F and its connections may be varied from the form shown, and I do not therefore confine myself to any specific form; but

What I claim as new, and desire to secure by Letters Patent, is—

1. In combination with the main axle of a tricycle, a wheel adapted to revolve thereon without touching the ground, and provided with suitable bearings, gearings, and connections, whereby it is made to rotate independently or in connection with supporting-wheels, substantially as and for the purposes set forth.

2. In combination with a main axle of a tricycle, a wheel loosely mounted thereon and adapted to revolve without touching the ground, said wheel being provided with clutches and shifting attachments to engage it to move with the main wheels, and having also chain-gearings, whereby it may be revolved either independently of or in connection with the main wheels, substantially as and for the purposes set forth.

ARTHUR E. McENTEE.

Witnesses:
DANL. WADE TEARS,
R. G. MONROE.